United States Patent

[11] 3,632,326

[72] Inventor George F. Ritter, Jr.
  Toledo, Ohio
[21] Appl. No. 861,000
[22] Filed Sept. 25, 1969
[45] Patented Jan. 4, 1972
[73] Assignee Libbey-Owens-Ford Company
  Toledo, Ohio

[54] METHOD AND APPARATUS FOR BENDING GLASS SHEETS
  8 Claims, 3 Drawing Figs.
[52] U.S. Cl. .................................................. 65/106,
  65/104, 65/268, 65/273, 65/351
[51] Int. Cl. .......................................................... C03b 23/02
[50] Field of Search .......................................... 65/104,
  114, 268, 273, 275, 348, 349, 350, 351, 106, 107

[56] References Cited
UNITED STATES PATENTS
3,468,645 9/1969 McMaster et al. ............ 65/114 X

*Primary Examiner*—Arthur D. Kellogg
*Attorney*—Collins and Oberlin

ABSTRACT: A method and apparatus for bending glass sheets in which a sheet is heated, prebent convexly upward by applying a jet of cool air to the upper surface thereof, and then bent in the opposite direction on an inertia-gravity bending mold. The apparatus includes an air nozzle which is arranged and controlled such that cooling air is applied only to the central area of the sheet in order to prevent edge vents from occurring.

INVENTOR
George F. Ritter, Jr.
BY Collins & Oberlin
ATTORNEYS

METHOD AND APPARATUS FOR BENDING GLASS SHEETS

The present invention relates to the production of curved glass sheets and more particularly to an improved method and apparatus for bending relatively large glass sheets by the inertia-gravity method.

Curved sheets of glass are widely used as glazing closures for vehicles, such as automobiles or the like. To be suitable for such application the curved sheets must be bent to precisely defined curvatures as dictated by the overall styling of the vehicle and by the manner of mounting the sheet in its opening. At the same time, it is important that the sheets meet rather stringent optical requirements and more particularly that the viewing area of the window or light be free of optical defects which would tend to interfere with the clear viewing of an object through the window.

In general, the commercial production of curved glass sheets of the above character includes heating the sheets to the softening point of the glass, bending the heated sheets to the desired curvature and thereafter subjecting them to a heat-treating process such as annealing or tempering.

One particularly successful procedure for producing such bent sheets is the so-called inertia-gravity process, which is described in detail in U.S. Pat. application Ser. No. 573,969, filed in the names of George F. Ritter, Jr., Frank J. Carson and Frank J. Hymore, now U.S. Pat. No. 3,476,540. According to this process the heat-softened sheets are positioned over a bending mold member and the mold and sheet are then accelerated rapidly in the direction opposite the desired direction of bending whereby an inertial force is exerted against the sheet to force it into registry with the shaping surface of the mold. Where the bending mold is oriented horizontally, gravity forces also enter into the bending of the sheet.

The simplicity and speed of the inertia-gravity process make it particularly attractive for the production of automotive glass and a continuing effort is being made to expand its use to larger sheets and more complex and severe curvatures. One particular problem which arises when attempting to bend sheets of the size currently required for automobile sidelights and backlights, for example a 40 inch × 50 inch sheet with a 126 inch cylindrical bend, is that of cross bending. The term cross bending refers to the tendency for the sheet to bend about an axis perpendicular to the desired axis of curvature which, if severe enough, can cause the sheet to be off form and not acceptable for production. While a certain amount of cross bending is allowable, it must be held to reasonable limits.

Cross bending is most pronounced in sheets which are more nearly square and begins when a heat-softened sheet first comes into contact with the mold, when the sheet is suspended between the ends of the mold and tends to sag toward the mold. If the bent axis is relatively long it will sag into a catenary curve until the mold accelerates it into conformity with the shaping surface thereof; however, if the sheet is more nearly square, it will tend to sag downward from the unsupported edges as well, resulting in a cross bend which may not be corrected after the mold is accelerated, the edges perpendicular to the desired axis of curvature remaining curled upward away from the mold. This is a most severe problem in inertia-gravity bending since there is no upper mold member to help force these edges into conformity with the shaping surface.

While attempts have been made to correct this by using auxiliary mold sections which contact only the edges which are intended to remain straight, the use of additional mold members tends to detract from the advantages of the inertia-gravity method.

Accordingly, the primary object of the present invention is to produce large, cylindrically bent sheets with a minimum of cross bending.

Another object of the invention is to produce such sheets by the inertia-gravity method.

Another object of the invention is to produce such sheets without the use of auxiliary mold members.

To accomplish these objectives, the present invention proposes to prebend or prebow the sheets, in a direction opposite that in which they are ultimately bent, before they contact the mold member. As a result of this prebending, the initial sag of the sheet as it contacts the mold will tend to return it to a flat condition at the time when the mold is accelerated to force the sheet into registry with the shaping surface. Experience has shown that with an optimum degree of prebending, cross bending can be eliminated, or at least minimized.

To accomplish the desired prebending, the invention contemplates applying differential cooling to the sheet before bending, with the higher degree of cooling being applied to the top of the sheets. This is known to cause the sheet to bow upward at the center, opposite the direction in which it will be bent.

Other objects and advantages of the invention will become more apparent during the course of the following description when taken in connection with the accompanying drawings.

In the drawings, wherein like numerals are employed to designate like parts throughout the same:

Figure 1:
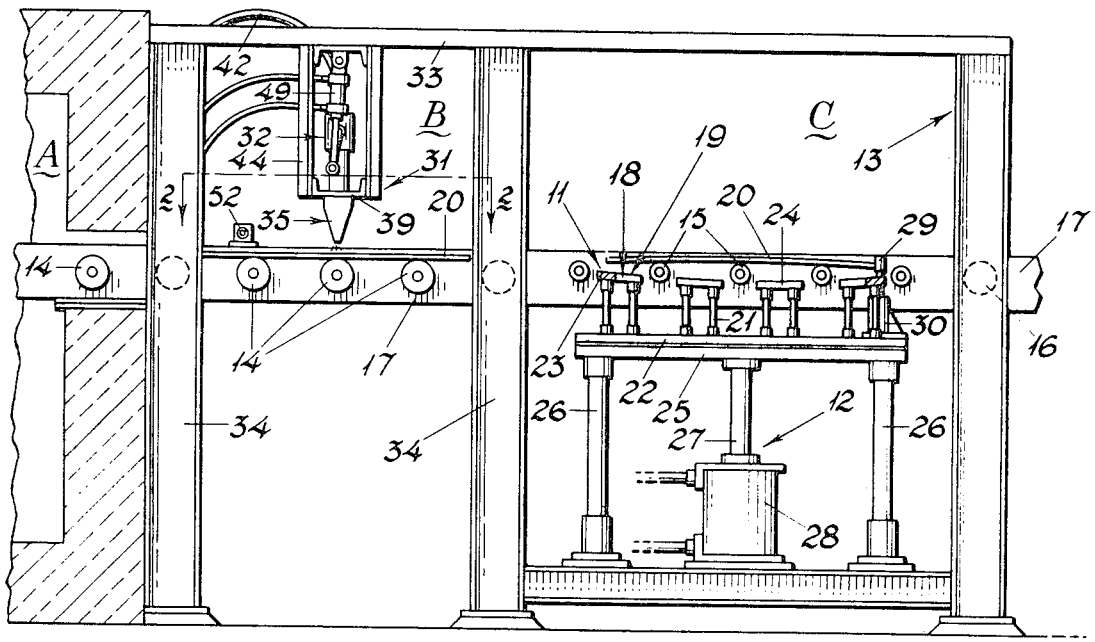
FIG. 1 is a side elevation view of a bending apparatus constructed in accordance with the present invention.

Referring to the drawings, there is illustrated a glass bending apparatus in which sheets of glass are transferred along a horizontal path through a heating section A where they are heated to the softening point, a prebending section B where they are initially bowed upward at the center, and a bending section C where the sheets are bent in the opposite direction into conformity with a bending mold.

Referring particularly to FIG. 1, the bending section consists essentially of a movable mold member 11 and an actuator 12 capable of accelerating the mold member rapidly upward, both suitably mounted within a rigid framework 13, and operating in conjunction with a conveyor system comprising entry and prebending rolls 14, bending section rolls 15, and exit rolls 16, all mounted on rail sections 17 running along either side of the framework 13.

The bending mold member 11 comprises an outline or ring-type shaping element 18 having a contoured shaping surface 19 formed on its upper face which engages only the marginal edge portions of a sheet 20 to be bent. The shaping element 18 is supported by a plurality of vertical bars 21 upstanding from a horizontal base member 22. Since the mold member 11 is vertically movable to lift a sheet 20 from the rolls 15, the shaping element 18 is made up of a plurality of sections including transverse end sections 23 and longitudinal side sections 24, spaced apart to provide clearance for the rolls.

The base member 22 is fastened to a carriage 25, and the carriage is supported by telescoping guide members 26 which allow vertical movement only, said vertical movement being provided by the ram 27 of a pressure cylinder 28 which bears against the bottom of the carriage.

When a sheet 20 is conveyed into position to be bent above the mold member 11 it is halted by engagement of its leading edge with locator stops 29 (one of two shown) which are moved into and out of the path of sheet movement by pressure cylinders 30 mounted on the base member 22. When the sheet 20 contacts the stops fluid pressure is applied to the lower end of cylinder 28 to rapidly move the mold member 11 upward lifting the sheet from the conveyor rolls 15. As the sheet is accelerated rapidly upward, combined inertial and gravitational forces cause to to sag into conformity with the mold. Once the sheet is lifted free of the rolls the stops 29 are returned to their normal position below the conveyor.

The prebending section comprises one or more air nozzles 31 mounted in position to direct cooling air against the tops of sheets traveling on the conveyor rolls 14, the air nozzle(s) including a regulating valve 32 which controls the flow of air therethrough. For purposes of illustration, a single nozzle is shown suspended from a crossmember 33 extending between vertical columns 34, one of which can be part of the framework 13. The nozzle 31 comprises an elongated tapered hood 35, enclosed by inclined walls 37 terminating in an elongated slot 38, end walls, and a channel section 39 which forms a top wall; a supply tube 40 connected to the top wall and extending upward therefrom; and a tubular valve body 41 which encloses the valve 32 and connects the supply tube 40 to a source of pressurized air through a flexible conduit 42 and fitting 43. Vertical angle members 44 connect the channel member 39 to a similar channel member 45 which is bolted or otherwise fastened to the crossmember 33 to mount the nozzle. The valve 32, comprises the body 41, a clapper or butterfly element 46 capable of closing off the passageway through the tube, and an actuator 47 adapted to rotate the butterfly element 46 by means of a pivot arm 48. In the illustrative embodiment, the actuator comprises a pressure cylinder 49 pivotally suspended from the channel member 45 and having a ram 50 linked to the pivot arm 48.

Figure 2:
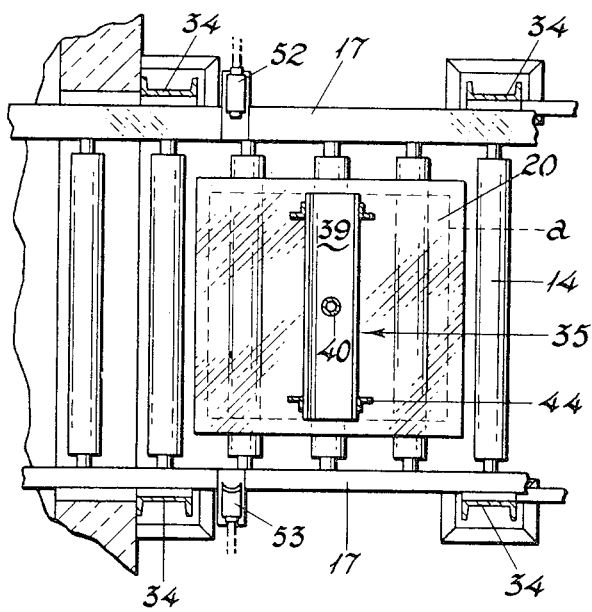
FIG. 2 is a section view taken at line 2-2 of FIG. 1.
Figure 3:
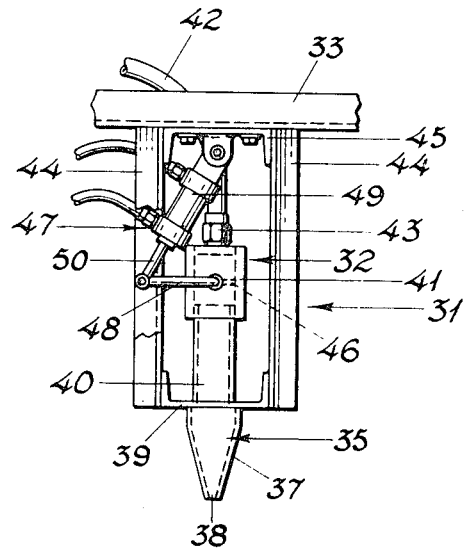
FIG. 3 is an enlarged elevation view, with parts cut away, of the cooling means in the prebending section.

Since there is a tendency for edge vents to form when differential cooling is applied to sheets coming directly from the furnace, the nozzle 31 is arranged and controlled so that only a central area bounded approximately by the dashed line $a$ in FIG. 2, is subjected to the cooling air. In the transverse direction this is accomplished simply by setting the length of the hood 35 accordingly; however, in the longitudinal direction this must be accomplished by controlling the airflow since the sheet moves along the conveyor. Although there are several well-known methods of performing such a control function, in the illustrative embodiment a photocell comprising a light source 52 and receiver 53 are positioned to detect the arrival of a sheet 20 at some predetermined point. By connecting the photocell in a circuit with well-known timing devices such as time delay relays and to a solenoid valve controlling airflow through the valve 32, the air nozzle can be controlled so that air is applied just after the leading edge of the sheet passes the opening 38 of the hood 35 and is shut off just before the trailing edge passes.

OPERATION

As a heat-softened sheet 20 leaves the heating section A it is carried beneath the air nozzle 31 which applies a relatively small amount of cooling air to the area bounded by the line $a$ (FIG. 2), causing the center of the sheet to bow upward. Although this would appear to be contrary to normally understood theories of expansion and contraction, what apparently happens is that as soon as the air hits the upper surface of the sheet it tends to set before any significant contraction can take place. The lower surface has more time to contract before it starts to set, and its contraction causes the sheet to bow convexly toward the surface which is more rapidly cooled. It can be appreciated that the degree of differential cooling will determine the extent of the bow.

As the sheet, which is still in a heat-softened condition, enters the bending area C it will be in a bowed condition as depicted in FIG. 1 and sagging toward the mold. As soon as it contacts the stops 29 pressurized fluid is applied to the bottom of cylinder 28 causing the mold member to be raised, lifting the sheet 20 from the rolls 15 and accelerating it rapidly upward to cause it to bend into conformity with the shaping surface 19. It can be appreciated that for every different size sheet and for every curvature there will be some optimum degree of prebending which will produce a sheet having a minimum cross bend.

I claim:

1. In a method for bending horizontally disposed heat-softened glass sheets by accelerating a sheet upwardly to cause it to sag into conformity with a concave shaping surface, the improvement comprising the step of prebending the sheet in the opposite direction from the desired bend, before it is subjected to said acceleration, by differentially cooling the upper and lower surfaces of the sheet with the greater cooling being applied to the upper surface.

2. A method for bending glass sheets as claimed in claim 1, in which at least one surface of said sheet is cooled by sweeping with pressurized cooling gas.

3. A method for bending glass sheets as claimed in claim 2, in which the upper surface only is swept by cooling gas.

4. A method for bending glass sheets as claimed in claim 2, in which said pressurized gas is applied to the central area only of the sheet surfaces, leaving the marginal edge portions substantially untouched thereby.

5. A method for bending horizontally disposed glass sheets, comprising the steps of heating a sheet to the softening point, prebending the sheet by applying cooling air to the central area of the upward facing surface thereof, supporting said sheet over a bending mold having a contoured, upward-facing shaping surface formed thereon, and then accelerating said mold member rapidly upward to lift said sheet bodily to cause it to sag in conformity with said shaping surface under the influence of inertial and gravitational forces.

6. A method of bending each of a plurality of glass sheets, comprising supporting each sheet in a substantially horizontal plane, moving the sheet thus supported along a predetermined path, heating the sheet as it travels along said path to substantially the softening point of the glass, initially cooling the upper surface only of said sheet as it moves along said path at a rate sufficient to cause the center of said sheet to bow upward to a predetermined curvature, stopping said sheet above a bending mold member having an upward facing concave shaping surface formed thereon, moving said mold member upward through said path into contact with the sheet, and then accelerating said mold member and said sheet bodily upward, said acceleration being sufficient to cause the sheet to settle into registry with said shaping surface under the influence of inertial and gravitational forces.

7. In apparatus for bending each of a plurality of horizontally disposed glass sheets, including means for moving said sheets along a horizontal path; a furnace disposed along said path for heating said sheets to the softening point; and bending means disposed along said path beyond said furnace, said bending means comprising a ring-type mold member having an upward-facing, concave shaping surface formed thereon disposed below said path, and means for accelerating said mold member upwardly to lift said sheet bodily upward from said path thereby creating combined inertial and gravitational forces bending said sheet into registry with said shaping surface; the improvement which comprises locating prebending means, comprising means for cooling a portion of the upper surface of a sheet to cause the sheet to bow upwardly at the center, above said sheet and between said furnace and said bending means.

8. Apparatus for bending glass sheets as claimed in claim 7, including means for restricting the effective area of said cooling means to an area spaced inwardly of the marginal edge portions of said sheet.

* * * * *